United States Patent
Boyce (10) Patent No.: US 11,539,755 B1
(45) Date of Patent: Dec. 27, 2022

(54) DECRYPTION OF ENCRYPTED NETWORK TRAFFIC USING AN INLINE NETWORK TRAFFIC MONITOR

(71) Applicant: Trend Micro Incorporated, Tokyo (JP)

(72) Inventor: Kevin G. Boyce, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 1 day.

(21) Appl. No.: 17/208,167

(22) Filed: Mar. 22, 2021

(51) Int. Cl.
*H04L 9/40* (2022.01)
*H04L 9/08* (2006.01)

(52) U.S. Cl.
CPC ............ *H04L 63/20* (2013.01); *H04L 9/0819* (2013.01); *H04L 63/0435* (2013.01); *H04L 63/10* (2013.01); *H04L 63/1408* (2013.01); *H04L 63/166* (2013.01)

(58) Field of Classification Search
CPC ... H04L 63/20; H04L 9/0819; H04L 63/0435; H04L 63/10; H04L 63/1408; H04L 63/166
See application file for complete search history.

(56) References Cited

U.S. PATENT DOCUMENTS

| | | | | |
|---|---|---|---|---|
| 9,967,292 | B1* | 5/2018 | Higgins | H04L 63/30 |
| 11,240,210 | B2* | 2/2022 | Jiang | G06Q 20/4015 |
| 2008/0263215 | A1* | 10/2008 | Schnellbaecher | H04L 63/0884 709/229 |
| 2009/0083538 | A1* | 3/2009 | Merugu | H04L 63/0281 713/153 |
| 2011/0231653 | A1* | 9/2011 | Bollay | H04L 9/0844 713/153 |
| 2016/0226827 | A1* | 8/2016 | Bohannon | H04L 63/0823 |
| 2018/0007038 | A1* | 1/2018 | Hsu | H04L 63/0428 |
| 2020/0053103 | A1* | 2/2020 | Rehak | H04L 63/0428 |

FOREIGN PATENT DOCUMENTS

CA 2 514 039 A1 1/2007

* cited by examiner

*Primary Examiner* — Michael R Vaughan
(74) *Attorney, Agent, or Firm* — Beyer Law Group LLP (57) ABSTRACT

An inline network traffic monitor is deployed inline between two endpoints of a computer network. A particular endpoint of the two endpoints works in conjunction with the inline network traffic monitor to decrypt encrypted network traffic transmitted between the two endpoints. A series of Change Cipher Spec (CCS) messages is exchanged between the inline network traffic monitor and the particular endpoint during a Transport Layer Security (TLS) handshake between the two endpoints. The series of CCS messages allows the particular endpoint and the inline network traffic monitor to detect each other on the computer network. After detecting each other's presence, the particular endpoint sends the inline network traffic monitor a session key that is used by the two endpoints to encrypt their network traffic. The inline network traffic monitor uses the session key to decrypt encrypted data of the network traffic transmitted between the two endpoints.

12 Claims, 9 Drawing Sheets

DECRYPTION OF ENCRYPTED NETWORK TRAFFIC USING AN INLINE NETWORK TRAFFIC MONITOR

BACKGROUND OF THE INVENTION

1. Field of the Invention

The present invention is directed to inspection of encrypted network traffic.

2. Description of the Background Art

Network traffic may be encrypted to prevent eavesdropping. For example, the Transport Layer Security (TLS) protocol has been developed to provide privacy and data integrity between two computers communicating over a computer network. The TLS protocol may run on top of the Transmission Control Protocol (TCP) and serve as the security layer of the Hypertext Transfer Protocol Secure (HTTPS) protocol.

Cybersecurity applications may require inspection of encrypted network traffic, i.e., network traffic that carry encrypted data. Decryption of encrypted network traffic is very difficult if not impossible without access to the associated encryption key. In the case of the TLS protocol, a session key is a symmetric key that is negotiated by a client and a server for encrypting network traffic transmitted between them. Without access to the session key, a network traffic monitor between the client and the server will not be able to inspect the network traffic.

SUMMARY

In one embodiment, an inline network traffic monitor is deployed inline between a first endpoint and a second endpoint of a computer network. The first endpoint may work in conjunction with the inline network traffic monitor to decrypt encrypted network traffic transmitted between the first and second endpoints. A series of Change Cipher Spec (CCS) messages is exchanged between the inline network traffic monitor and the first endpoint during a Transport Layer Security (TLS) handshake between the first and second endpoints. The series of CCS messages allows the first endpoint and the inline network traffic monitor to detect each other on the computer network. After detecting each other's presence, the first endpoint sends the inline network traffic monitor a session key that is used by the first and second endpoints to encrypt their network traffic. The inline network traffic monitor uses the session key to decrypt encrypted data of the network traffic transmitted between the first and second endpoints.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
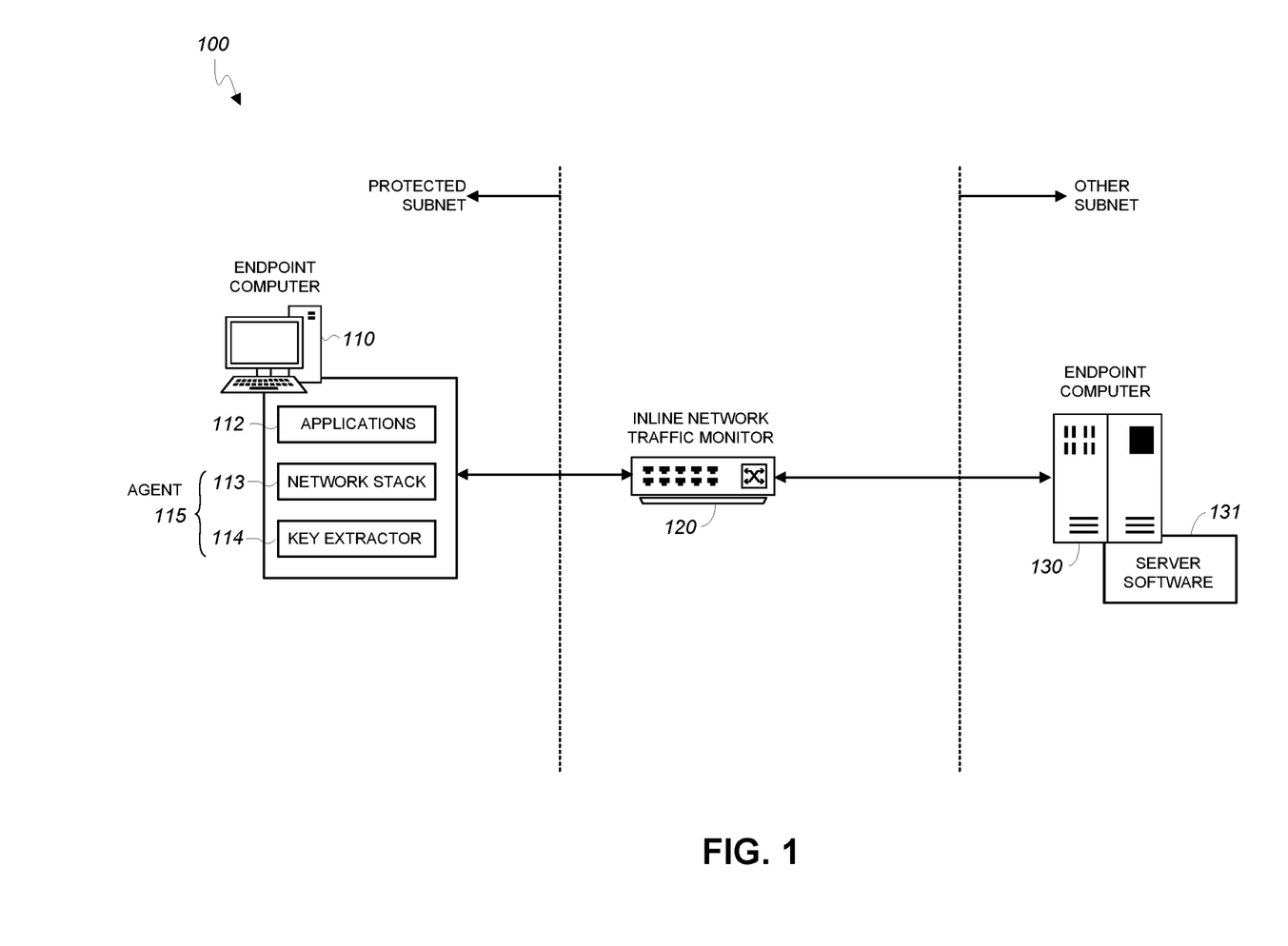
FIG. 1 shows a logical diagram of a computer network in accordance with an embodiment of the present invention.

FIG. 1 shows a logical diagram of a computer network 100 in accordance with an embodiment of the present invention. In the example of FIG. 1, an endpoint computer 110 and an inline network traffic monitor 120 are components of a cybersecurity system for inspecting encrypted network traffic transmitted over the computer network. The endpoint computer 110 may be on a protected subnet of the computer network, whereas an endpoint computer 130 may be on another subnet of the computer network.

In some network topography, such as when load balancing is performed, it may be difficult for the endpoint computer 110 and the network traffic monitor 120 to detect each other in the computer network. Embodiments of the present invention address this problem as discussed below.

The endpoint computer 110 may be a laptop computer, a desktop computer, or other computing device (i.e., hardware). The endpoint computer 110 may have a memory that stores instructions of one or more applications 112, a network stack 113, and a key extractor 114. A processor of the endpoint computer 110 may execute the instructions stored in the memory. As will be more apparent below, the network stack 113 and the key extractor 114 form an agent 115 in the endpoint computer 110 for working in conjunction with the network traffic monitor 120 to decrypt encrypted network traffic.

The network stack 113 comprises one or more software modules for sending and receiving data over a computer network. The network stack 113 may be implemented by modifying a conventional network stack, adding a parallel network stack, or adding a module into an existing network stack (e.g., using the LINUX NETFILTER or the Microsoft Windows™ NDIS) to allow the endpoint computer 110 to detect presence of the inline network traffic monitor 120 and send a session key to the inline network traffic monitor 120 as explained below.

An application 112 may comprise a computer application, such as an email application, a web browser, and the like. The application 112 may send and receive data over a computer network by way of the network stack 113.

Embodiments of the present invention are explained in the context of the TLS 1.3 protocol. Generally speaking, the TLS protocol includes a handshake process during which a client and a server negotiates to use a symmetric session key for encrypting data transmitted between the client and the server. The details of the TLS handshake are well known and not repeated here.

Key extraction algorithms have been developed to obtain the session key in a host, such as the endpoint computer 110. The key extractor 114 may employ any suitable conventional key extraction algorithm to obtain the session key in the endpoint computer 110. Examples of key extraction algorithms that may be employed by the key extractor 114 include the so-called shared library interposition; kernel/operating system library hooking; and memory scraping.

The endpoint computers 110 and 130 are "endpoints" of a TCP session between communicating computer applications of the endpoint computers 110 and 130. In the example of FIG. 1, an application 112 running on the endpoint computer 110 communicates with a server software 131 running on the endpoint computer 130. The endpoint computer 130 may be a server computer or other computing device (i.e., hardware). In this example, the endpoint computer 110 functions as a client and the endpoint computer 130 functions as a server. For example, the application 112 may be a web browser that accesses a server software 131 that implements a website. In one embodiment, the endpoint computers 110 and 130 encrypt network traffic in accordance with the TLS 1.3 protocol. The network traffic is encrypted in that it carries encrypted data being transmitted between the endpoint computers 110 and 130.

The network traffic monitor 120 may comprise a server computer, a security appliance, a gateway, or other computing device (i.e., hardware). As its name indicates, the network traffic monitor 120 is inline between the endpoint computers 110 and 130. Being inline allows the network traffic monitor 120 to receive and intercept all network traffic transmitted between the endpoint computers 110 and 130. In one embodiment, the network traffic monitor 120 is configured to detect presence of the endpoint computer 110, indicates its presence to the endpoint computer 110, receive the session key from the endpoint computer 110, and use the session key to decrypt encrypted data of network traffic transmitted between the endpoint computers 110 and 130. The functionality of the network traffic monitor 120 may be implemented in software, hardware (e.g., field programmable gate array (FPGA), programmable logic device (PLD)), or a combination of software and hardware. The network traffic monitor 120 may include a processor and a memory, with the memory storing instructions of software components of the network traffic monitor 120.

Figure 2:
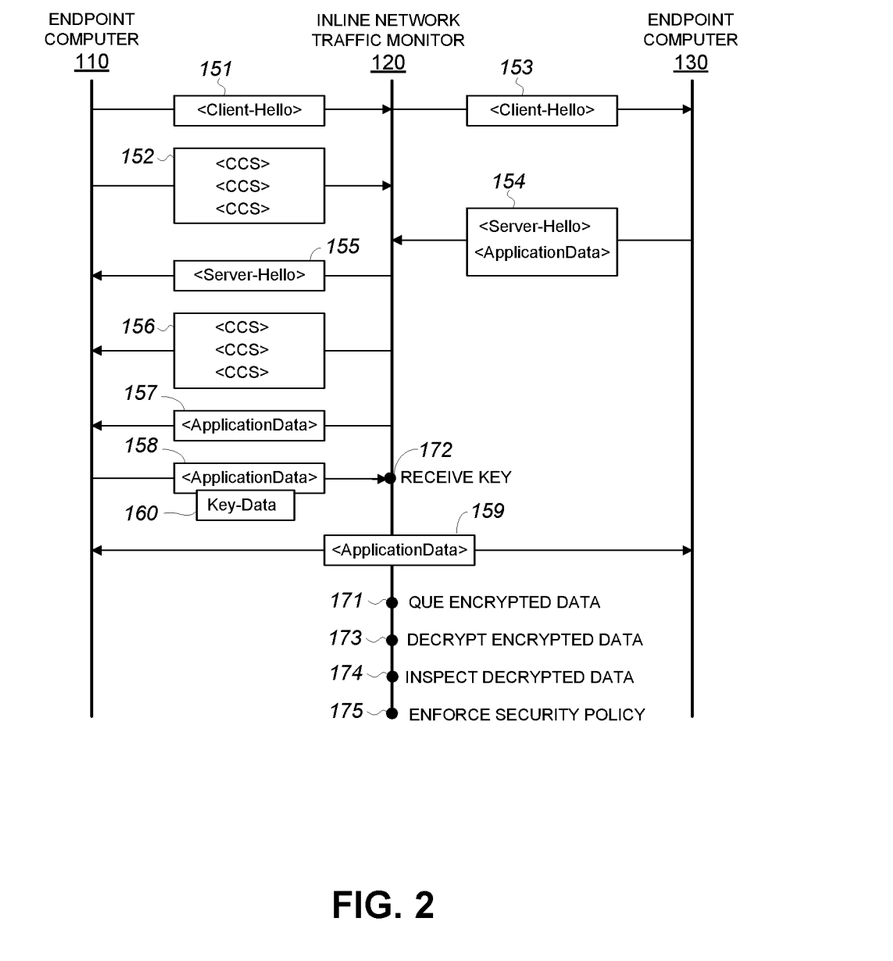
FIG. 2 shows a call diagram of a method of decrypting encrypted network traffic in accordance with an embodiment of the present invention.

FIG. 2 shows a call diagram of a method of decrypting encrypted network traffic in accordance with an embodiment of the present invention. In the example of FIG. 2, an application 112 running on the endpoint computer 110 attempts to communicate with a server software 131 running on the endpoint computer 130. The communication between the endpoint computers 110 and 130 may be in accordance with HTTPS. After a TCP connection has been established between the endpoint computers 110 and 130, the endpoint computer 110 initiates a TLS handshake with the endpoint computer 130 by sending a client-hello message in accordance with the TLS protocol (see block 151). To determine if the network traffic monitor 120 is present between the endpoint computers 110 and 130, the endpoint computer 110 sends out, in addition to the client-hello message, a series of Change Cipher Spec (CCS) messages (see block 152). A series of CCS messages may be combined into a single protocol data unit (PDU). In the example of FIG. 2, the endpoint computer 110 sends three consecutive CCS messages right after sending the client-hello message.

Generally speaking, a CCS message indicates a change in the encryption scheme to be used by the client and the server. Normally, the client may be expected to send a single CCS message. Here, however, a plurality of CCS messages (e.g., three consecutive) is sent by the endpoint computer 110 to detect presence of the network traffic monitor 120, which works in conjunction with the endpoint computer 110 as part of the cybersecurity system for inspecting encrypted network traffic. In the event the network traffic monitor 120 is not present, the plurality of CCS messages will be, in effect, ignored by the endpoint computer 130.

In the example of FIG. 2, the network traffic monitor 120 is present and receives the series of CCS messages from the endpoint computer 110, indicating to the network traffic monitor 120 that the endpoint computer 110 is part of the cybersecurity system and is expected to send the session key to the network traffic monitor 120 at a later time. The network traffic monitor 120 forwards the client-hello message, but not the series of CCS messages, to the endpoint computer 130 (see block 153).

In response to the client-hello message, the endpoint computer 130 sends a server-hello message and application data to the endpoint computer 110 (see block 154). The application data sent by the endpoint computer 130 may include additional handshake information, such as the digital certificate of the endpoint computer 130.

The network traffic monitor 120 intercepts the response from the endpoint computer 130 and forwards the server-hello message separately from the application data. More particularly, the network traffic monitor 120 forwards the server-hello message to the endpoint computer 110 (see block 155) and thereafter sends a series of CCS messages to the endpoint computer 110 (see block 156). After sending the series of CCS messages, the network traffic monitor 120 forwards the application data to the endpoint computer 110 (see block 157).

The series of CCS messages from the network traffic monitor 120, which consists of three consecutive CCS messages in this example, indicates to the endpoint computer 110 that the network traffic monitor 120 is present and between the endpoint computers 110 and 130. After a session key to be used by the endpoint computers 110 and 130 has been established, the key extractor 114 extracts the session key. The network stack 113 then forwards the session key (see key data 160) to the network traffic monitor 120 as part of an application data (see block 158). The endpoint computer 110 may communicate with the network traffic monitor 120 by multiplexing on the existing TCP/TLS connection to the endpoint computer 130. Advantageously, this guarantees that messages between the endpoint computer 110 and the network traffic monitor 120 will follow the same network path to take into consideration possible load balancing, equal-cost multi-path (ECMP) routing, etc.

The network traffic monitor 120 is configured to monitor and collect all network traffic between the endpoint computers 110 and 130 (see block 159). The network traffic monitor 120 may queue the collected encrypted data of the network traffic in a buffer or other data storage (see action 171). Once the network traffic monitor 120 receives the session key from the endpoint computer 110 (see action 172), the network traffic monitor 120 uses the session key to decrypt the encrypted data (see action 173) and inspect the decrypted data (see action 174).

The decrypted data may be inspected to perform cybersecurity operations, such as to enforce network security policies (see action 175). The network security policies may include blocking the communication between the endpoint computers 110 and 130 when the decrypted data indicates a cyber threat, such as transmission of malicious code, unauthorized access, data leakage, theft of confidential information, communication with unauthorized or malicious websites, etc. As can be appreciated, the inspection of the decrypted data and the enforcement of the security policy may be performed by the network traffic monitor 120 or some other computing device. Other cybersecurity operations that may be performed include notification of an alert to a management system, adjustment of network security policy, termination of instance or Virtual Machine, etc. responsive to the decrypted data being detected as malicious.

The time window for receiving the session key in the network traffic monitor 120 depends on the time it takes to extract the session key in the endpoint computer 110. Generally, key extraction is a fast operation and can be completed in microseconds, i.e., the queue buffer may only need to store one or two messages worth of encrypted data. Optionally, in some cybersecurity applications, the network traffic monitor 120 may block or drop network traffic from the endpoint computer 130 to prevent the network traffic from reaching the endpoint computer 110 before inspection, and the endpoint computer 110 may hold or drop network traffic for the endpoint computer 130 until the endpoint computer 110 has sent the session key to the network traffic monitor 120.

Depending on implementation, the TCP session between the endpoint computers 110 and 130 may need to be adjusted to accommodate the series of CCS messages exchanged between the endpoint computer 110 and the network traffic monitor 120. For example, TCP sequence numbers of the TCP session may be adjusted, such as described in Canadian Patent Application CA2514039A1 by Rares Stefan et al.

Alternatively, instead of establishing a single TCP connection between the endpoint computers 110 and 130 with the network traffic monitor 120 in between, the network traffic monitor 120 may be configured to perform TCP proxying or splicing. In this alternative embodiment, two TCP connections are established, with one TCP connection between the endpoint computer 110 and the network traffic monitor 120 and a second TCP connection between the network traffic monitor 120 and the endpoint computer 130.

The message communication protocol between the endpoint computer 110 and the network traffic monitor 120 may be implemented a number of ways, including by an indirect path via message queue, a direct path with an ad-hoc protocol, or a direct path following the TLS record format. A direct path following the TLS record format, as illustrated in FIG. 2, is preferable for latency and compatibility reasons. For security reasons, because there may be additional network traffic monitors between the endpoint computer 110 and the network traffic monitor 120, messages transmitted between the endpoint computer 110 and the network traffic monitor 120 may be encapsulated in application data PDUs, which are encrypted. A separate session key may be negotiated between the endpoint computer 110 and the network traffic monitor 120 using the encrypted PDUs as a communication channel by using provisioned digital certificates of the endpoint computer 110 and the network traffic monitor 120. The endpoint computer 110 and the network traffic monitor 120 may also use a pre-configured session key to encrypt messages transmitted between them. If a TLS handshake is used to generate a separate session key for the endpoint computer 110 and the network traffic monitor 120, the separate session key may be cached and shared between all sessions from the endpoint computer 110 that go through the network traffic monitor 120.

There are a number of ways a session between the endpoint computer 110 and the network traffic monitor 120 or a session between the endpoint computer 130 and the network traffic monitor 120 can be multiplexed over an existing TCP/TLS connection. For example, messages may be multiplexed inside a TLS application data record. In that case, the TLS application data record may contain either an embedded application data between the endpoint computers 110 and 130, or a multiplexed message between the endpoint computer 110 and the network traffic monitor 120 or a multiplexed message between the endpoint computer 130 and the network traffic monitor 120, with the multiplexed message containing a handshake or an application data message. This aspect of the present invention is now explained with reference to FIG. 3.

Figure 3:
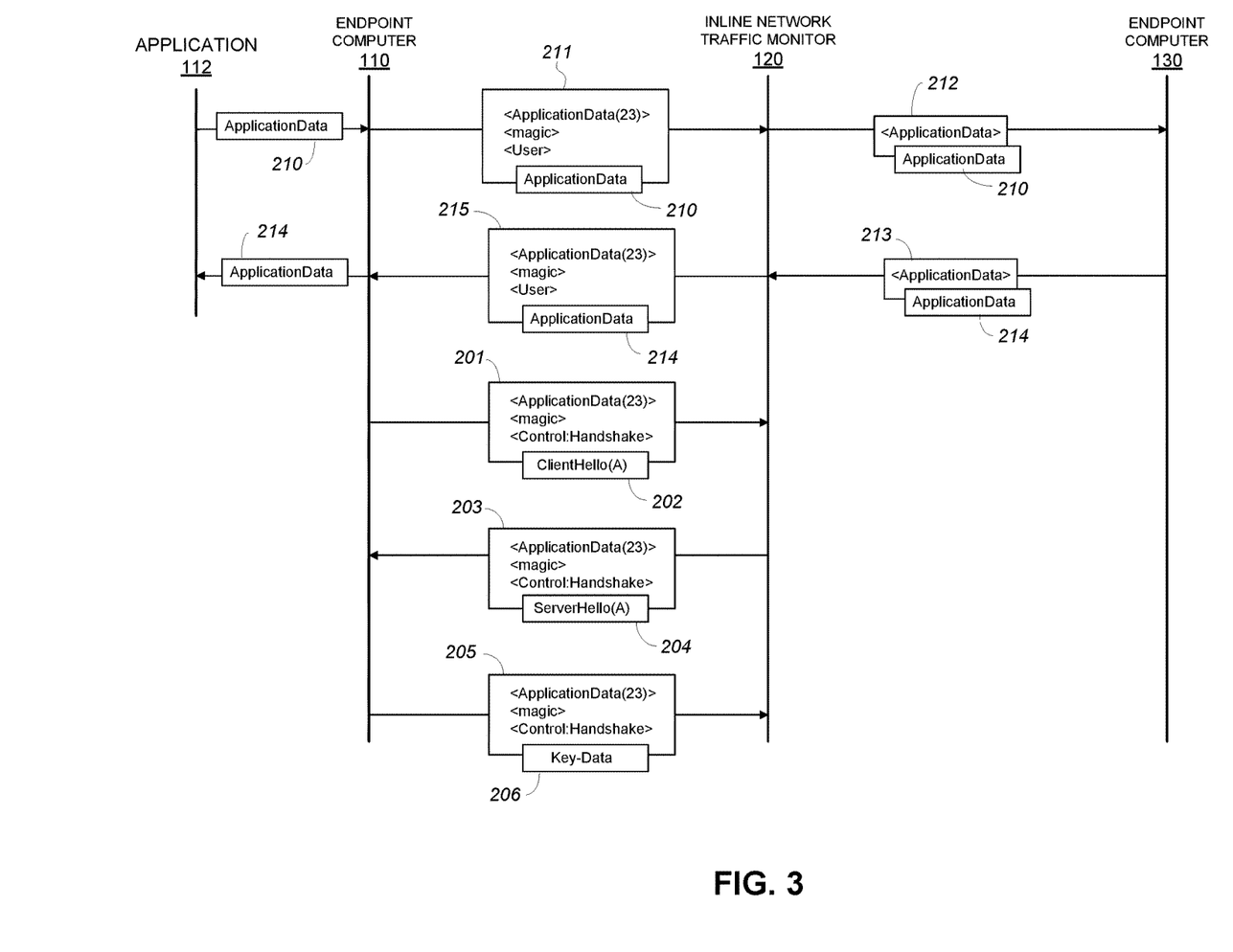
FIG. 3 shows a call diagram of a method of multiplexing communications between an endpoint computer and an inline network traffic monitor in accordance with an embodiment of the present invention.

FIG. 3 shows a call diagram of a method of multiplexing communications between an endpoint computer and an inline network traffic monitor in accordance with an embodiment of the present invention. In the example of FIG. 3, the multiplexing is performed for communications between the endpoint computer 110 and the inline network traffic monitor 120. As can be appreciated, the same multiplexing methodology may be applied to communications between the network traffic monitor 120 and the endpoint computer 130.

In the example of FIG. 3, after detecting each other's presence, the endpoint computer 110 and the network traffic monitor 120 start communicating using a predetermined communication protocol that involves multiplexing control messages on the existing TCP/TLS connection between the endpoint computers 110 and 130. The control messages are encapsulated in a wrapped application data. For example, as illustrated in FIG. 3, a <magic> header may be used to indicate presence of a multiplexing header.

In the example of FIG. 3, a client-hello message (see control message 202) is sent by the endpoint computer 110 to the network traffic monitor 120 in a wrapping application data (see block 201). The network traffic monitor 120 unwraps and receives the client-hello message and recognizes it as a control message from the endpoint computer 110. As a response, the network traffic monitor sends a server-hello message (see control message 204) in a wrapping application data to the endpoint computer 110 (see block 203). The endpoint computer 110 unwraps and receives the server-hello message, which the endpoint computer recognizes as a control message from the network traffic monitor 120. The network traffic monitor 120 and the endpoint computer 110 may authenticate to each other using provisioned digital certificates. If the authentication passes, the endpoint computer 110 thereafter sends the session key (see key data 206) negotiated between the endpoint computers 110 and 130 in a wrapping application data (see block 205).

In the example of FIG. 3, the application 112 sends an application data 210 to the endpoint computer 130. The endpoint computer 110 encapsulates the application data 210 in a wrapping application data (see block 211). The network traffic monitor 120 receives and unwraps the application data 210. The network traffic monitor 120 does not recognize the application data 210 as a control message intended for the network traffic monitor 120, and accordingly forwards the application 210 to the endpoint computer 130 (see block 212). Similarly, the endpoint computer 130 sends an application data 214 to the endpoint computer 110 (see block 213). The network traffic monitor 120 receives the application data 214 and forwards the application data 214 in a wrapping application data (see block 215) to the endpoint computer 110. The endpoint computer 110 receives and unwraps the application data 214 and forwards the application data 214 to the application 112.

Figure 4:
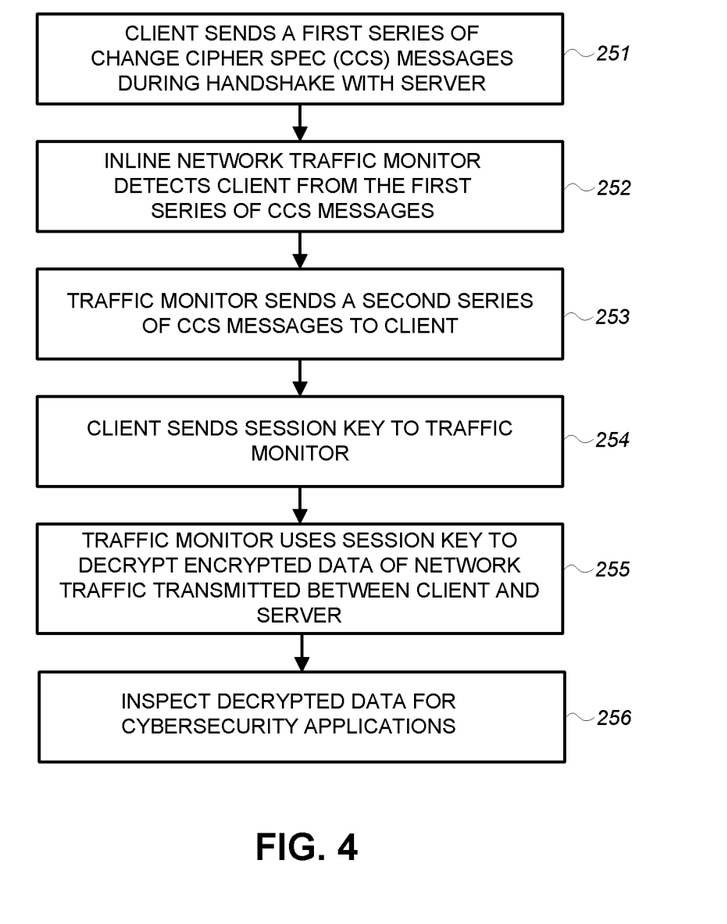
FIG. 4 shows a flow diagram of a method of decrypting encrypted network traffic in accordance with an embodiment of the present invention.

FIG. 4 shows a flow diagram of a method of decrypting encrypted network traffic in accordance with an embodiment of the present invention. In the method of FIG. 4, a client (e.g., FIG. 1, 110) sends a first series of CCS messages during a TLS handshake with a server (e.g., FIG. 1, 130) (step 251). The client may send the first series of CCS messages right after sending a client-hello message to the server to detect presence of an inline network traffic monitor (e.g., FIG. 1, 120) that works in conjunction with the client to inspect encrypted network traffic transmitted between the client and the server.

The network traffic monitor intercepts the first series of CCS messages and detects, based on the first series of CCS messages, that the client is part of the cybersecurity system for inspecting encrypted network traffic and that the client will subsequently send a session key used by the client and the server to encrypt network traffic (step 252). To alert the client of its presence, the network traffic monitor sends the client a second series of CCS messages (step 253). The network traffic monitor may send the second series of CCS messages right after forwarding to the client a server-hello message sent by the server.

The client receives the second series of CCS messages, which informs the client that the network traffic monitor is part of the cybersecurity system. At a later time, the client sends to the network traffic monitor the session key that is used to encrypt network traffic transmitted between the client and the server (step 254). The network traffic monitor receives the session key and uses the session key to decrypt encrypted data of encrypted network traffic transmitted between the client and the server (step 255). The decrypted data is inspected for cybersecurity applications (step 256). Examples of such cybersecurity applications include enforcement of network security policies, training of machine learning systems, threat detection, security compliance or auditing, etc.

In the above-described embodiments, the client works in conjunction with the network traffic monitor to inspect encrypted network traffic. As can be appreciated, the server, instead of the client, may work in conjunction with the network traffic monitor to inspect encrypted network traffic as now described with reference to FIG. 5.

Figure 5:
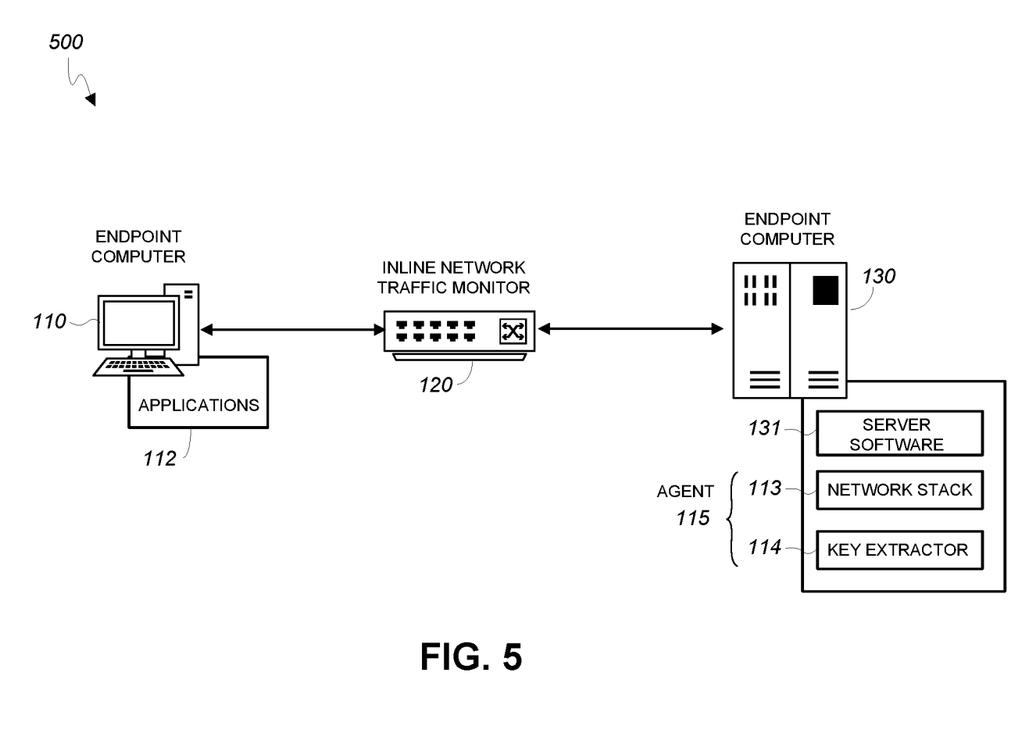
FIG. 5 shows a logical diagram of a computer network in accordance with an embodiment of the present invention.

FIG. 5 shows a logical diagram of a computer network 500 in accordance with an embodiment of the present invention. The computer network 500 is the same as the computer network 100 (shown in FIG. 1) except that the endpoint computer 130 and the network traffic monitor 120 form the cybersecurity system for inspecting encrypted network traffic. Accordingly, the agent 115 comprising the network stack 113 and the key extractor 114 is running on the endpoint computer 130, instead of on the endpoint computer 110.

Figure 6:
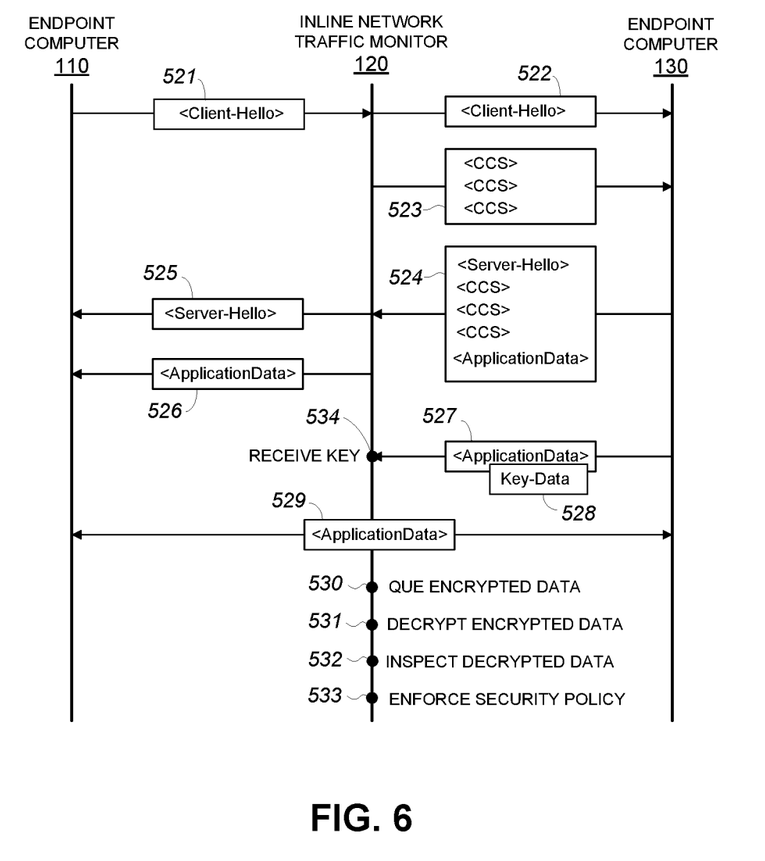
FIG. 6 shows a call diagram of a method of decrypting encrypted network traffic in accordance with an embodiment of the present invention.

FIG. 6 shows a call diagram of a method of decrypting encrypted network traffic in accordance with an embodiment of the present invention. The method of FIG. 6 is for the embodiment where the server works with the network traffic monitor to inspect encrypted network traffic as in the computer network 500.

In the example of FIG. 6, the application 112 running on the endpoint computer 110 attempts to communicate with the server software 131 running on the endpoint computer 130. The communication between the endpoint computers 110 and 130 may be in accordance with HTTPS. After a TCP connection has been established between the endpoint computers 110 and 130, the endpoint computer 110 initiates a TLS handshake with the endpoint computer 130 by sending a client-hello message in accordance with the TLS protocol (see block 521). The network traffic monitor 120 forwards the client-hello message to the endpoint computer 130 (see block 522).

To signal its presence to the endpoint computer 130, the network traffic monitor 120 sends out a series of CCS messages (see block 523) to the endpoint computer 130. The series of CCS messages may be combined into a single PDU. In the example of FIG. 6, the network traffic monitor 120 sends three consecutive CCS messages to the endpoint computer 130 right after forwarding the client-hello message to the endpoint computer 130.

The endpoint computer 130 receives the three consecutive CCS messages, which informs the endpoint computer 130 that the network traffic monitor 120 is present between the endpoint computer 110 and the endpoint computer 130. To alert the network traffic monitor 120 of its presence, the endpoint computer 130 sends out a series of CCS messages (e.g., three consecutive CCS messages) to the network traffic monitor 120 (see block 524). The endpoint computer 130 may send out the responsive series of CCS messages in between sending a server-hello message and application data to the endpoint computer 110. The endpoint computer 130 may combine the server-hello message, the series of CCS messages, and application data into a single PDU.

The network traffic monitor 120 receives the server-hello message, the series of CCS messages, and application data from the endpoint computer 130. The series of CCS messages from the endpoint computer 130 indicates to the network traffic monitor 120 that the endpoint computer 130 is part of the cybersecurity system and is expected to send a session key to the network traffic monitor 120 at a later time. The network traffic monitor 120 forwards the server-hello message (see block 525) and application data (see block 526), but not the series of CCS messages, to the endpoint computer 110.

After a session key to be used by the endpoint computers 110 and 130 has been established, the key extractor 114 extracts the session key. The network stack 113 then forwards the session key (see key data 528) to the network traffic monitor 120 as part of an application data (see block 527). The endpoint computer 130 may communicate with the network traffic monitor 120 by multiplexing on the existing TCP/TLS connection to the endpoint computer 110.

The network traffic monitor 120 is configured to monitor and collect all network traffic between the endpoint computers 110 and 130 (see block 529). The network traffic monitor 120 may queue the collected encrypted data of the network traffic in a buffer or other data storage (see action 530). Once the network traffic monitor 120 receives the session key from the endpoint computer 130 (see action 534), the network traffic monitor 120 uses the session key to decrypt the encrypted data (see action 531) and inspect the decrypted data (see action 532). The decrypted data may be inspected to perform cybersecurity operations, such as to enforce security policies (see action 533). The inspection of the decrypted data and the enforcement of the security policy may be performed by the network traffic monitor 120 or some other computing device.

Figure 7:
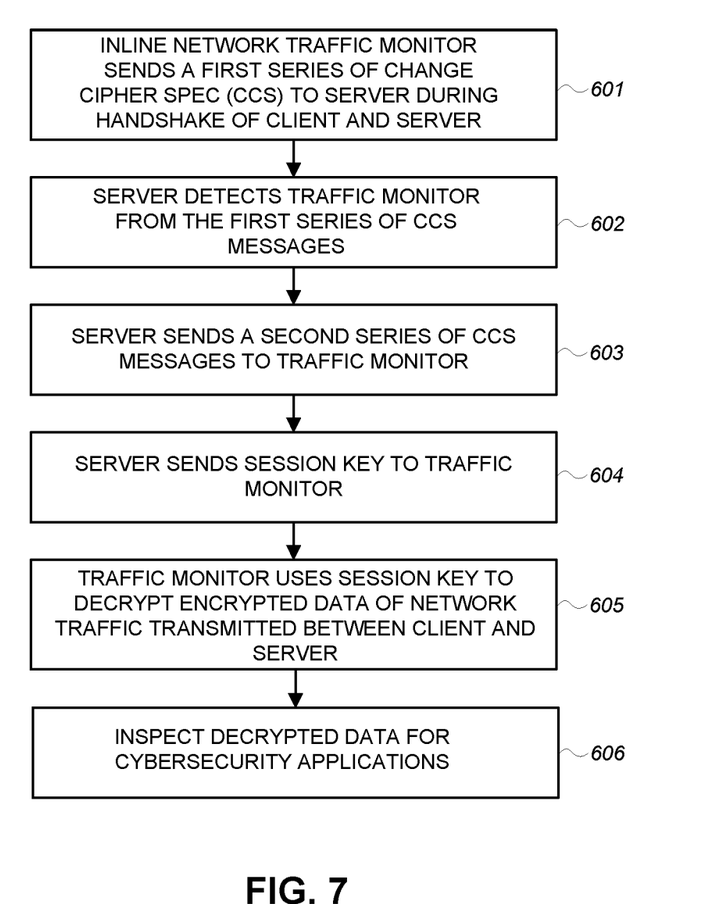
FIG. 7 shows a flow diagram of a method of decrypting encrypted network traffic in accordance with an embodiment of the present invention.

FIG. 7 shows a flow diagram of a method of decrypting encrypted network traffic in accordance with an embodiment of the present invention. In the method of FIG. 7, an inline network traffic monitor (e.g., FIG. 5, 120) sends a first series of CCS messages to a server (e.g., FIG. 5, 130) during a TLS handshake between a client (e.g., FIG. 5, 110) and the server (step 601). The network traffic monitor may send the first series of CCS messages right after forwarding a client-hello message from the client to the server.

The server receives the client-hello message and the first series of CCS messages. The first series of CCS messages informs the server that the network traffic monitor is part of the cybersecurity system for inspecting encrypted network traffic (step 602). To alert the network traffic monitor of its presence, the server sends the network traffic monitor a second series of CCS messages (step 603). The server may send the second series of CCS messages along with a server-hello message and application data that the server is sending to the client.

The network traffic monitor receives the second series of CCS messages, which informs the network traffic monitor that the server is part of the cybersecurity system and will subsequently send a session key used by the client and the server to encrypt network traffic. At some point, the server sends to the network traffic monitor the session key that is used to encrypt network traffic transmitted between the client and the server (step 604). The network traffic monitor receives the session key and uses the session key to decrypt encrypted data of encrypted network traffic transmitted between the client and the server (step 605). The decrypted data is inspected for cybersecurity applications (step 606).

The above-described embodiments have been explained in the context of a physical computer network, where the endpoint computers and the inline traffic monitor are implemented as devices, i.e., hardware. As can be appreciated, embodiments of the present invention may also be implemented in a virtual computer network, such as part of a software-defined networking (SDN). This aspect of the invention is now explained with reference to FIG. 8.

Figure 8:
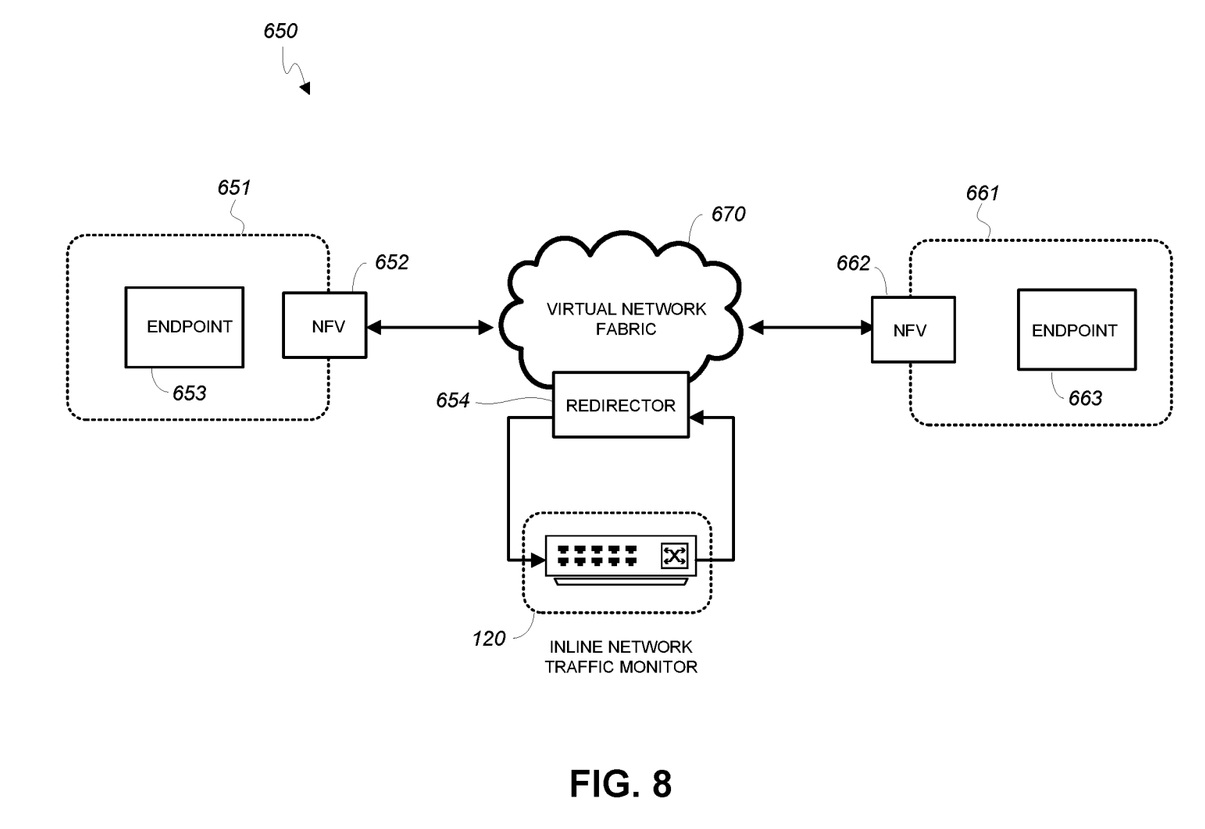
FIG. 8 shows a logical diagram of a virtual computer network in accordance with an embodiment of the present invention.

FIG. 8 shows a logical diagram of a virtual computer network 650 in accordance with an embodiment of the present invention. The virtual computer network 650 includes a virtual private cloud 651 and a virtual private cloud 661. The virtual private cloud 651 includes an endpoint 653, whereas the virtual private cloud 661 includes an endpoint 663. Each of the endpoints 653 and 663 may comprise a virtual computer (e.g., virtual machine). A network function virtualization (NFV) 652 and an NFV 662 allow the endpoints 653 and 663, respectively, to communicate over a virtual network fabric 670. A redirector 654 coupled to the virtual network fabric 670 redirects traffic between the NFV 652 and the NFV 662 to the inline network traffic monitor 120. This allows the network traffic monitor 120 to monitor and intercept all network traffic transmitted between the endpoints 653 and 663.

A redirector 654 may be implemented as a traffic gateway to redirect network traffic to a network traffic monitor 120 that is implemented in hardware. The redirector 654 may also be implemented as a virtual redirect to redirect network traffic to a network traffic monitor 120 that is implemented as a virtual computer or as a software component of the virtual network fabric 670. The endpoints 653 and 663 may communicate in accordance with the TLS protocol and may work in conjunction with the network traffic monitor 120 to inspect encrypted network traffic as previously described.

Embodiments of the present invention provide advantages heretofore unrealized. Generally speaking, it is difficult to detect and communicate with an inline network traffic monitor because the network traffic monitor may be hidden by a load balanced router or have no other network access. In some cases, it is not possible to directly communicate with the network traffic monitor because it may not have an Internet Protocol (IP) address or be routable. There may also be multiple network traffic monitors sharing the load. Even if it is possible to communicate directly with the network traffic monitor, such as by cloud message queue, doing so would result in much higher latency and session key exposure. Embodiments of the present invention overcome the above difficulties, while being relatively easy to implement in existing computer networks.

Figure 9:
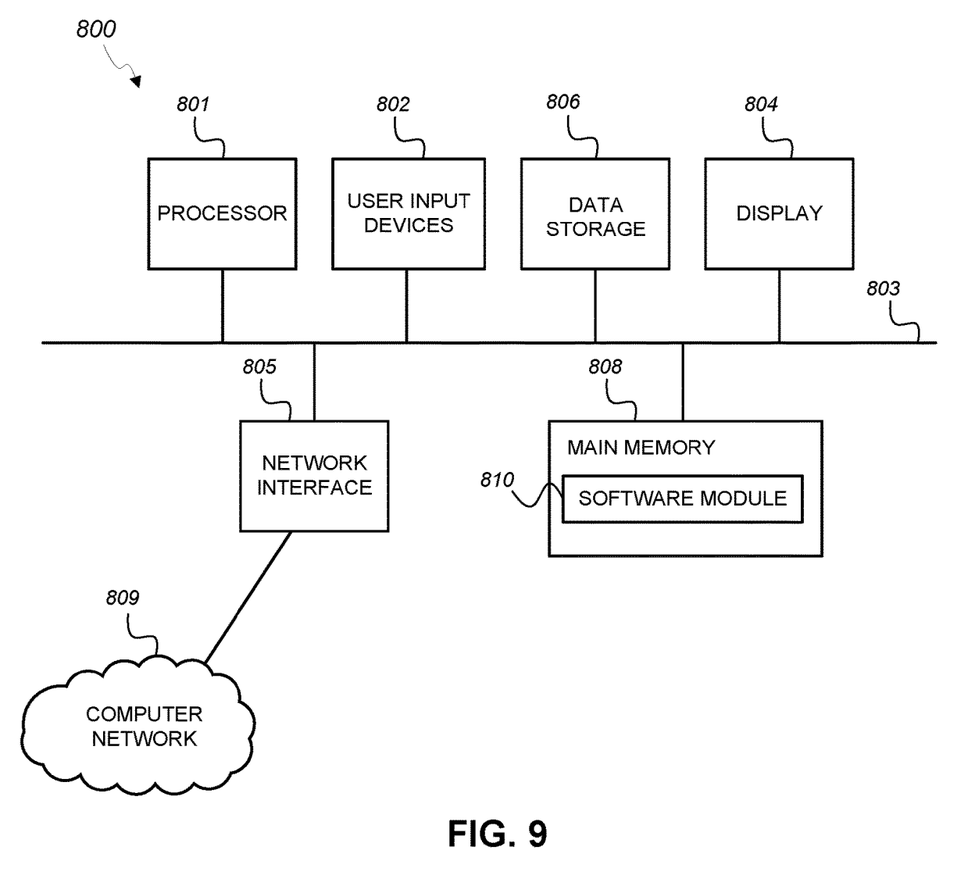
FIG. 9 shows a logical diagram of a computer system that may be employed with embodiments of the present invention.

Referring now to FIG. 9, there is shown a logical diagram of a computer system 800 that may be employed with embodiments of the present invention. The computer system 800 may be employed as an endpoint computer, an inline network traffic monitor, or other computing devices described herein. The computer system 800 may have fewer or more components to meet the needs of a particular cybersecurity application. The computer system 800 may include one or more hardware processors 801. The computer system 800 may have one or more buses 803 coupling its various components. The computer system 800 may include one or more user input devices 802 (e.g., keyboard, mouse), one or more data storage devices 806 (e.g., hard drive, optical disk, solid state drive), a display screen 804 (e.g., liquid crystal display, flat panel monitor), a computer network interface 805 (e.g., network adapter, modem), and a main memory 808 (e.g., random access memory). The computer network interface 805 may be coupled to a computer network 809.

The computer system 800 is a particular machine as programmed with one or more software modules 810, comprising instructions stored non-transitory in the main memory 808 for execution by the processor 801 to cause the computer system 800 to perform corresponding programmed steps. An article of manufacture may be embodied as computer-readable storage medium including instructions that when executed by the processor 801 cause the computer system 800 to be operable to perform the functions of the one or more software modules 810. In one embodiment where the computer system 800 is configured as an endpoint computer, the software modules 810 comprise one or more computer applications, a network stack, and a key extractor.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of decrypting encrypted network traffic transmitted over a computer network, the method comprising:

receiving a first series of Change Cipher Spec (CCS) messages from a client that communicates with a server over a Transport Control Protocol (TCP) connection, the first series of CCS messages being sent out by the client during a Transport Layer Security (TLS) handshake with the server, wherein the first series of CCS messages comprises a first plurality of CCS messages;

in response to receiving the first series of CCS messages, sending a second series of CCS messages to the client, wherein the second series of CCS messages comprises a second plurality of CCS messages;

after sending the second series of CCS messages, receiving from the client a session key for encrypting network traffic transmitted between the client and the server;

decrypting, using the session key, encrypted data of network traffic transmitted between the client and the server to generate decrypted data; and inspecting the decrypted data to enforce a security policy.

2. The method of claim 1, wherein the security policy indicates blocking network traffic of a prohibited website.

3. The method of claim 1, wherein the security policy indicates blocking network traffic carrying malicious data.

4. The method of claim 1, further comprising:

sending, by the client, a client-hello message to the server, wherein the client sends out the first series of CCS messages after sending the client-hello message but before the server sends out a responsive server-hello message.

5. The method of claim 1, wherein the second series of CCS messages is sent to the client after receiving a server-hello message from the server.

6. The method of claim 5, wherein the server-hello message is sent by the server to the client along with application data.

7. The method of claim 6, wherein the second series of CCS messages is sent out to the client after forwarding the server-hello message to the client but before forwarding the application data to the client.

8. A system comprising:

a first endpoint computer comprising a memory and a processor; and an inline network traffic monitor that is deployed inline between the first endpoint computer and a second endpoint computer, the second endpoint computer comprising a memory and a processor, the inline network traffic monitor being configured to exchange a series of Change Cipher Spec (CCS) messages with the first endpoint computer during a Transport Layer Security (TLS) handshake of the first and second endpoint computers, to receive a session key from the first endpoint computer, to decrypt encrypted data of encrypted network traffic transmitted between the first and second endpoint computers using the session key to generate decrypted data, and to inspect the decrypted data to enforce a security policy, wherein the first endpoint computer is configured to send a first series of CCS messages to the inline network traffic monitor after sending a client-hello message to the second endpoint computer but before receiving a server-hello message from the second endpoint computer, wherein the inline network traffic monitor is configured to send a second series of CCS messages to the first endpoint computer after receiving the server-hello message from the second endpoint computer, wherein each of the first and second series of CCS messages comprises a plurality of CCS messages.

9. The system of claim 8, wherein the inline network traffic monitor receives the server-hello message along with application data from the second endpoint computer, and the inline network traffic monitor is configured to send out the second series of CCS messages to the first endpoint computer after forwarding the server-hello message to the first endpoint computer but before forwarding the application data to the first endpoint computer.

10. A method of decrypting encrypted network traffic transmitted over a computer network, the method comprising:

sending a first series of Change Cipher Spec (CCS) messages to a server that communicates with a client over a Transport Control Protocol (TCP) connection, the first series of CCS messages being sent out to the server during a Transport Layer Security (TLS) handshake of the client with the server, wherein the first series of CCS messages comprises a first plurality of CCS messages;

receiving a second series of CCS messages from the server, wherein the second series of CCS messages comprises a second plurality of CCS messages;

after receiving the second series of CCS message, receiving from the server a session key for encrypting network traffic transmitted between the client and the server;

decrypting, using the session key, encrypted data of network traffic transmitted between the client and the server to generate decrypted data; and inspecting the decrypted data to enforce a security policy.

11. The method of claim 10, wherein the security policy indicates blocking network traffic of a prohibited website.

12. The method of claim 10, wherein the security policy indicates blocking network traffic carrying malicious data.

* * * * *